Figure 2:
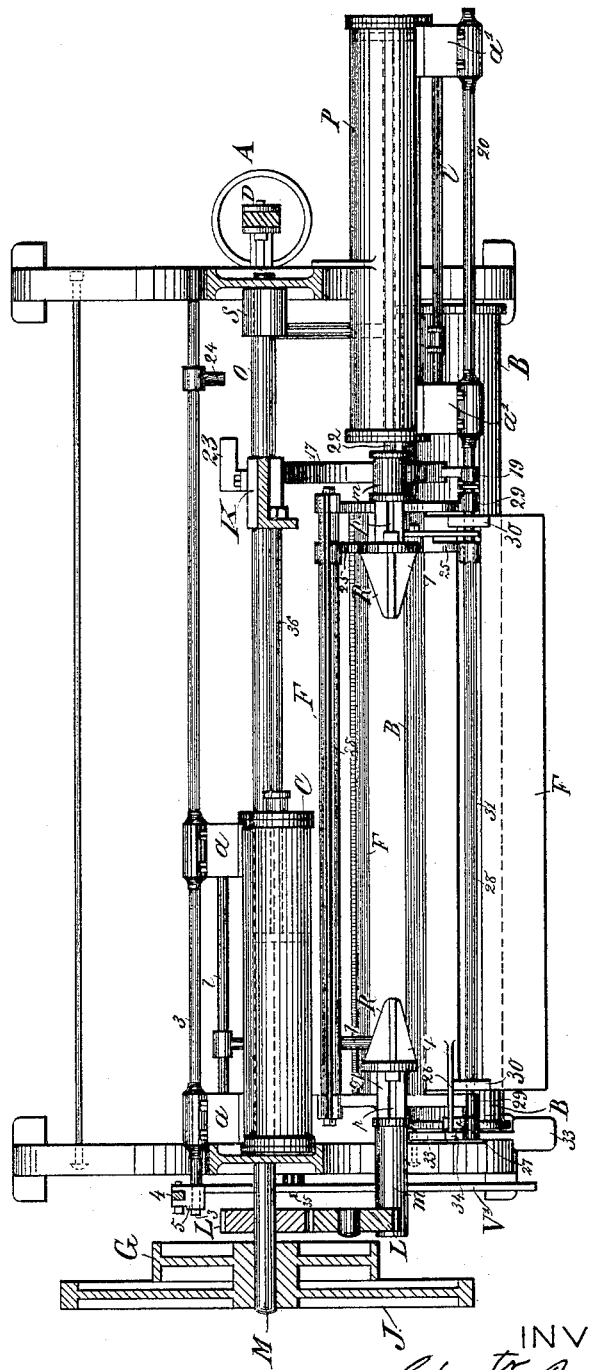

(No Model.)  5 Sheets—Sheet 1.
C. R. JAMES.
MACHINE FOR MAKING UPHOLSTERERS' SPRINGS.
No. 439,518. Patented Oct. 28, 1890.
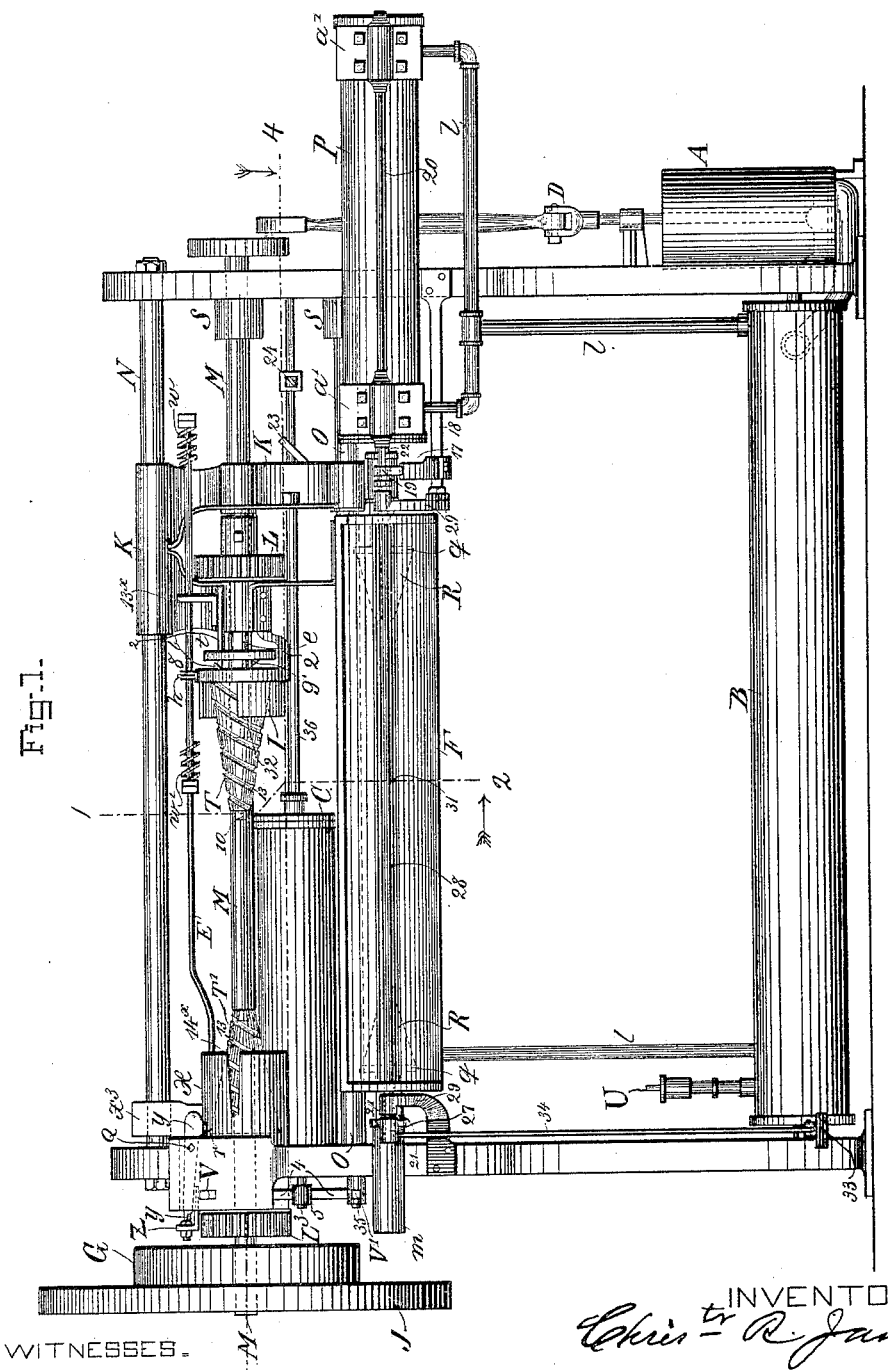
WITNESSES:
INVENTOR:
Chris<sup>tr</sup> R. James,
By A. P. Thayer.
his Attorney (No Model.)  5 Sheets—Sheet 2.
C. R. JAMES.
MACHINE FOR MAKING UPHOLSTERERS' SPRINGS.
No. 439,518.  Patented Oct. 28, 1890.
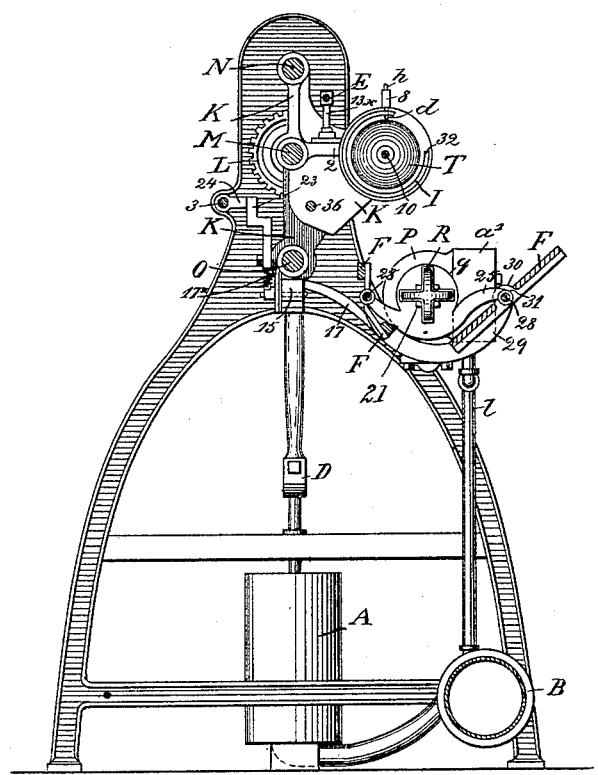
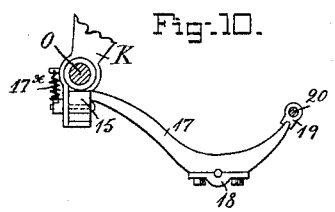
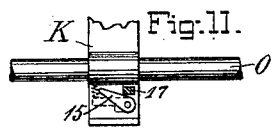
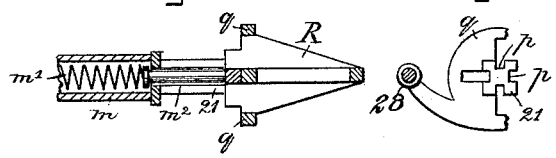
WITNESSES:
Ch. J. Morgan
W. P. Earll
INVENTOR:
Chris. R. James
By A. P. Thayer
atty (No Model.)  5 Sheets—Sheet 3.

C. R. JAMES.
MACHINE FOR MAKING UPHOLSTERERS' SPRINGS.

No. 439,518.  Patented Oct. 28, 1890.

WITNESSES:
D. J. Morgan
Wilfred P. Earl

INVENTOR.
Chris't'r R. James
By A. P. Thayer
his Attorney (No Model.) 5 Sheets—Sheet 4.
C. R. JAMES.
MACHINE FOR MAKING UPHOLSTERERS' SPRINGS.
No. 439,518. Patented Oct. 28, 1890.
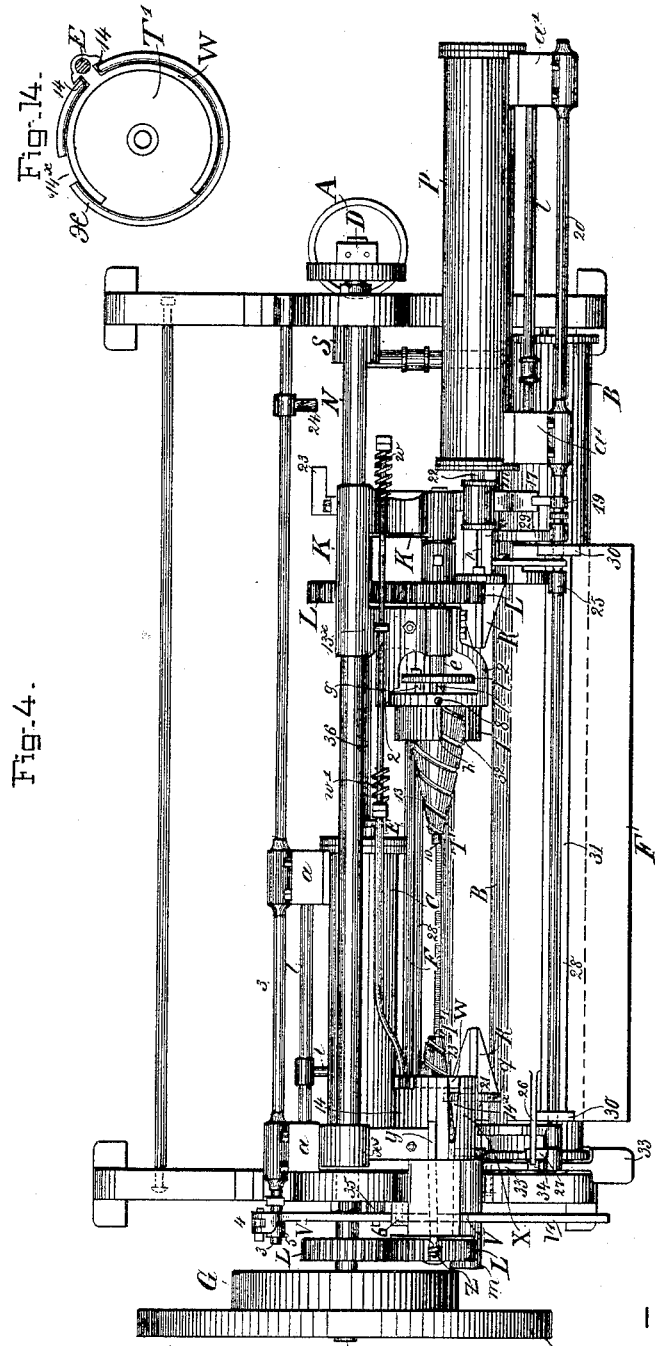
WITNESSES:
INVENTOR:
Chris'tr R James
By A P Thayer.
his Attorney (No Model.) 5 Sheets—Sheet 5.
C. R. JAMES.
MACHINE FOR MAKING UPHOLSTERERS' SPRINGS.
No. 439,518. Patented Oct. 28, 1890.
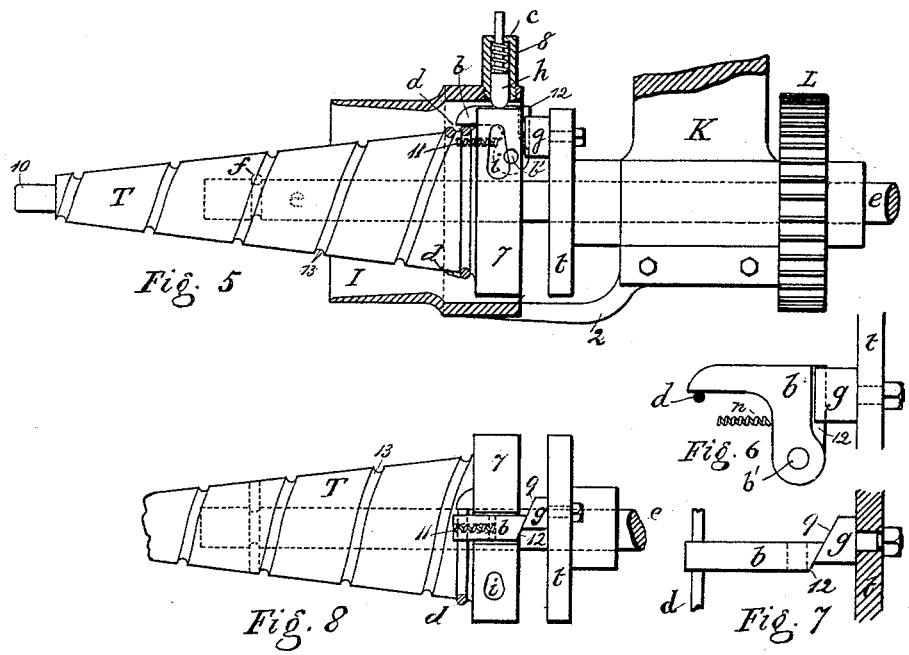
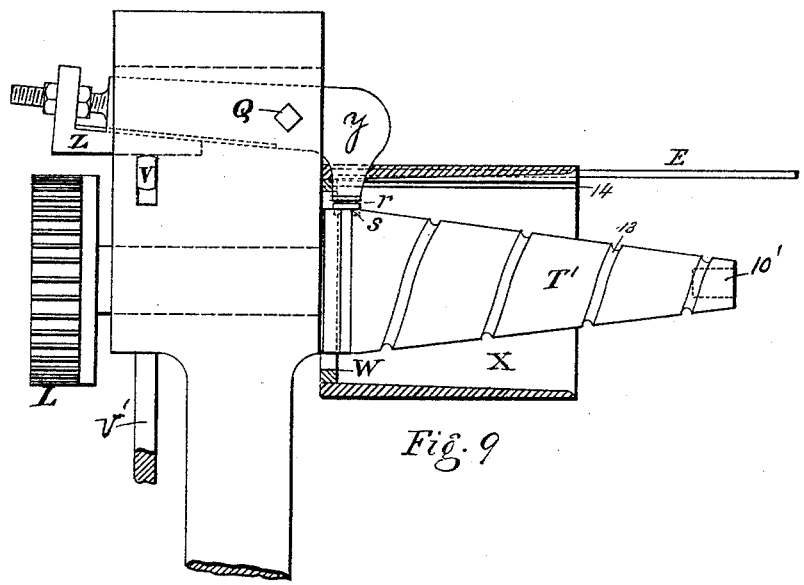
WITNESSES:
INVENTOR
Chris R James,
BY A. P. Thayer
ATTORNEY

UNITED STATES PATENT OFFICE.

CHRISTOPHER R. JAMES, OF JERSEY CITY, NEW JERSEY.

MACHINE FOR MAKING UPHOLSTERERS' SPRINGS.

SPECIFICATION forming part of Letters Patent No. 439,518, dated October 28, 1890.

Application filed February 12, 1889. Serial No. 299,681. (No model.)

*To all whom it may concern:*

Be it known that I, CHRISTOPHER RETALLIC JAMES, a subject of the Queen of Great Britain and Ireland, and a resident of Jersey City, in the county of Hudson and State of New Jersey, have invented certain new and useful Improvements in Machines for Making Upholsterers' Springs, of which the following is a specification.

The object of my invention is to introduce certain improvements in a machine for making upholsterers' springs, whereby they can be produced with greater rapidity and at less cost than has hitherto been possible.

My improvements mainly consist in the application of devices by which springs can be completed without either stopping or reversing the machine; also, in such form of construction as will insure the stopping of that portion of the mandrel into which the end of the wire is inserted until commencing to form a spring, and in such a manner that the gripping action shall cause the said mandrel to rotate and so coil the spring; also, in a contrivance whereby the springs are forced out of the spring-holder when they have been formed and cut off; also, in the contrivance in the machine of pneumatic appliances automatically operating in such a way that the whole process becomes virtually automatic, the attendant having merely to insert the end of the wire into a stationary mandrel in the first place, and then to guide it into the groove of the mandrel during the coiling of the spring.

Previously spring-making machines have generally been operated by reversing-belts, clutch-gearing, or a combination of both through the agency of levers in charge of the operator, and the wire has had to be inserted while the mandrels were in motion. All such machines are imperfect by reason of the many complications incident to them and the great difficulty of feeding without incurring serious loss of time.

To more particularly describe my invention, I will now refer to the accompanying drawings, in which—

Figure 1 is a side elevation of the machine. Fig. 2 is a transverse section on line 1 2 of Fig. 1. Fig. 3 is a horizontal section on line 3 4 of Fig. 1. Fig. 4 is a plan view of the entire machine. Fig. 5 is an enlarged view, partly in section, of one cone and its attachments, forming the portion of the mandrel for gripping the wire and setting the mandrel in motion automatically, and for automatically stopping the mandrel when the springs are discharged. Fig. 6 is a side view of part of the gripping and starting devices. Fig. 7 is a plan view of same, partly in section. Fig. 8 is a plan of part of the devices of Fig. 5. Fig. 9 is a side elevation of the finishing-cone and cutting-off attachments and a section of the guard thereof. Figs. 10 and 11 are details of the devices for opening the valves of the compressing-ram by the cross-head. Figs. 12 and 13 are details of the apparatus for compressing the springs. Fig. 14 is a detail showing the guard over the finishing-cone and the ejector for discharging the springs in front view.

Like letters and figures refer to the same parts in each of the several views.

A represents an air-pump, B an accumulator, and C a pneumatic ram to move the cross-head K and its attachments.

The cones T and T' form the mandrel upon which the springs are wound, T being called the "primary cone" and being mounted on the cross-head K, and T' being mounted in a stationary position in the same axis. The pinions L, the main shaft M, and the driving-pulley G cause the cones T T' to revolve.

N and O are stay-rods, which also form guides for the cross-head K.

The shaft M and the rod O support the rubber cushions S.

I shows a spring-holder bolted to the cross-head K by the arms 2, and consisting of a sort of hollow cylinder-guard surrounding part of the cone T.

J shows a balance-wheel, and D is a piston and connecting-rod coupled with the shaft M for working the air-pump A for charging the accumulator.

E, Figs. 9 and 14, is a rod carrying an arc of the ring W within the spring-holder or guard X for ejecting the springs therefrom, said holder being a hollow guard surrounding the base of the cone T'.

The part *y* is a lever, pivoted at Q, having its end $r$ forming an abutment, against which the wire is cut off after the spring has been coiled by the cutter $s$ in the base portion of the cone T'.

Z is an adjustable wedge between the levers $y$ and V, these levers and wedge when actuated by the thrust produced by the wire when cut operate the valves in the chests $a$ of the ram C through the rod 3, to which the lever V is connected by a link 4 and a crank 5, said lever V being pivoted at 6.

F is a cradle or catcher to receive the springs from the cones or mandrel after being coiled on them and to hold them centrally to the compressing-plates $q\,q$, one of which advances toward the other to compress the springs after being coiled.

U is a safety-valve on the accumulator B.

P is a pneumatic ram for actuating one of the compressing-plates $q$.

Suitable pipes $l\,l$ communicate between the respective cylinders C and P and the accumulator B.

Having now pointed out some of the essential parts of the machine, I will include the operation of the machine in the further description of the same. Suppose the machine to be in motion. Then the face-plate $t$, which is geared to the main shaft M by the wheels L through the shaft $e$, will be running, but the cone T will be stationary, because it is free to turn on the shaft $e$, or for the shaft $e$ to turn in it, and is held in position by a catch $h$, which is made to sink into a slight indentation $i$ at a suitable spot in the face of the base-hub 7 of the cone T by means of a small spring $c$, as shown in Fig. 5, said slide and spring being supported in the socket 8 on the upper part of the guard I. A groove in the shaft $e$ and a pin $f$ prevent the cone T from coming off the said shaft. The face-plate $t$, being keyed to the shaft $e$, necessarily revolves with it. The plate $t$ has a projecting gripper and cone-driving piece $g$, bolted or otherwise firmly fixed thereto, and beveled on the outer end, which presents an oblique face 9 in the forward direction of rotation, which passes the gripper $b$, pivoted in the head 7 of the cone T, at each revolution, so long as no wire $d$ is present. The gripper $b$ is free to move on its pivot $b'$ in the cone-head 7, and is kept in open position by a spring 11, as shown. It further has an inclined face 12, similar to the face 9 of the cone-driving piece $g$, only that it is inclined in the opposite direction, these two faces being in range of each other and touching and passing by the escape of the gripper $b$ in the absence of the wire, but effecting the gripping of the wire and the driving of the cone when the wire $d$ is inserted, in which case there is not room for $g$ to pass $b$, and consequently the wire is firmly held. The gripping apparatus $b$ is thus locked to the plate $t$, which forces the stop $h$ out of the indentation by the overpowering force of the said locked gripper and driver, and causes the cone T to revolve at the same speed as the shaft $e$, the said indentation $i$ being suitably inclined for the escape of the stop $h$. The wire is inserted through the slot 32 of the guard I by the attendant while the gripper $g$ is making one round, and is then gripped, and the cone is set in motion by the next contact of the grippers $g$ and $b$. The rotation then continues until the coiled spring is cut off at $r$ on the opposite cone T'. It is to be understood that the cones are in connection with each other with the center 10 of one in the socket 10' (shown dotted in Fig. 9) of the other when the spring is so coiled, said cones having the spiral groove 13, on which the wire runs. When the wire $d$ is released from the gripper $b$, the mandrel is at once stopped by the catch $h$ acting in the indentation $i$ until the wire is again inserted. In the last coil of the completed spring the wire runs between the cutter $s$ and the abutment $r$, and is cut off, as before stated. When no wire is present, the cutter $s$ just passes the abutment $r$ of the end of the lever $y$ without touching; but when the wire comes under said end it is severed because there is not room for it between the cutter and said end. At the same time that the wire is cut the end of the lever $y$, which forms the abutment upon which the wire is cut, is slightly raised by the thrust of the wire on it through the effect of the cutter in the rotating cone T', and through its long arm acting on the lever V, which is connected at its other end with the crank of valve-rod 3, opens the valves contained in the chests $a$ by turning the rod 3, and admits compressed air from the accumulator B to the ram C. By this means the cross-head K, on which the cone T is mounted, and which is connected to the piston-rod 36 of the ram C, is forced back until it reaches the rubber cushions S, when the spring just formed and cut off will drop into the cradle or catcher F. The cone T is by this operation pulled out of one end of the spring and the other end is stripped off the cone T' and out of the holder X by the ring W through the rod E and the arm $13^\times$ of the cross-head K, said arm shifting the rod E by means of its contact with the buffer $w$. The guard or holder X is a cylindrical hood attached to the frame back of the cone T' and partly supported by the arm $x^3$, extending from the stay-rod N, said guard X suitably projecting forward over said cone the same as the guard I projects over the cone T, and its purpose is to prevent undue expansion of the springs after the wire is cut. It is slotted lengthwise at 14 for the connection of the rod E with the ejector W through one side, and it is also slotted at $14^\times$ to admit the wire to be coiled. During the passage of the cross-head K to the cushions S the latch 15 on said cross-head passes under the end of the lever 17, pivoted to the rod 18 and connecting with a projecting arm 19, as seen in Figs. 10 and 11, of the valves of the ram P, so that on the return movement of the cross-head, said latch having been raised again by its spring 17×, this latch passes over said end of the lever 17 and depresses it, thus turning the rod 20 of the pneumatic ram P and operating the valves of the said ram P in chests $a'$ thereof. This admits air from the accumulator B to the back of the piston in the ram P, thus causing it to rush forward and compress the spring immediately after it has fallen into the cradle F between the plates $q$ and $q$, which, with the centering wing-cones R, are located in the cradle, one of said plates being supported in a stationary position on the forward end of the rod 21 and the other being mounted on the forward end of the piston-rod 22 of the ram P. The wing-cones are fitted to slide in the grooves $p$ in the rods 21 and 22, respectively, so as to retire and allow the plates $q\ q$ to approach each other sufficiently to close positively on the spring between them, and they are backed with coiled springs $m'$ in suitable spring-sockets $m$ behind the wing-cones to project them forward suitably for centering the springs between the plates $q\ q$ previous to the closing of said plates on the springs. At $m$, Fig. 12, are shown cylindrical spring-sockets back of the grooved parts of the rod 21, in which are springs $m'$, connected with the said wing-cones by rods $m^2$. When the cross-head K reaches the cushions S, the inclined beveled arms 23 on it, strikes the arm 24 of the rod 3, reversing the valves of the ram C, and so causes the cross-head and its cone T to return to the original position ready for coiling the next spring, and the arm 13× reverses the ejector W by contact with the buffer $w'$ on the rod E. In like manner when the cross-head 25 of the ram P has reached the end of its forward movement in compressing the spring it reverses the valves of the ram P and causes it to return to the normal position, said cross-head 25 traversing for a short distance the inclined projection 26, placed in a suitable position on the pivoted front side of the cradle F inside of and below its pivot, so as to swing said inside downward to depress the arm 27 of the rod 28 20, and by the same operation to open the cradle by thus swinging the front part of the same, as may be understood from Figs. 2 and 4, and allows the spring to fall, and thus be discharged. It is designed that the said swinging part of the cradle shall close by gravitation; or it may have a spring for closing it. The cross-head 25 of the compressing-ram P runs on the guide-rods 28, supported in an arm 29, suitably attached to the frame, and one of said rods is connected to and forms an extension of the valve-rod 20 of the ram P, being the same as above designated 28 20. The front side of the cradle F is pivoted to the front guide-rod 28 by the ears 30, and it has a slot 31, in which runs the end of the cross-head 25, carried on said rod. The pinion L on the driving-shaft M, which gears into the pinion contained in the cross-head K, is so keyed to the shaft M as to be free to move along the said shaft, but is compelled to revolve with it, as such devices are commonly arranged.

It is to be understood that the valve devices of the pneumatic rams are of the common well-known sort used in steam-pumps and the like, with rods, as 3 and 20, and tappet-shifting arms, as shown in connection with these rods, and the respective cross-heads to reverse them at the end of the stroke, and it is therefore unnecessary to illustrate or describe them particularly. There is a hand-lever V' coupled to the valve-shifting rod 3 by the link 4', (not shown, but in a vertical line with the link 4, to which the automatic lever V is connected,) and the crank 5 is pivoted at 35, to be used in case of need to shift the valves of the ram C by hand, and there is also a foot-treadle 33 coupled to the arm 27 of the valve-rod 28 by the rod 34, which it may be preferred to use for reversing the ram P, instead of depending on the automatic action of the cross-head 25 on the inclined arm 26.

I claim as my invention—

1. The combination, with the primary cone of the spring-winding mandrel arranged for being normally stationary on the rotating driving-shaft, of continuously-rotating driving mechanism, substantially as described, automatically releasing the mandrel through the release of the gripper from the driver by the discharge of the spring, as set forth.

2. The combination, with the primary cone of the spring-winding mandrel arranged for being normally stationary on the rotating driving-shaft, of the continuously-rotating driving mechanism, substantially as described, automatically releasing the mandrel through the release of the gripper from the driver by the discharge of the spring, and the automatic stop for holding the mandrel while inserting the wire, as set forth.

3. The combination, with the primary cone of the spring-winding mandrel normally stationary on the rotating shaft, of the wire-gripper in the head of said cone and the driving-gripper on the rotating face-plate normally inactive in the absence of the wire, but automatically engaged by the wire-gripper when the wire is presented, and thus rotating the mandrel for coiling the spring, substantially as described.

4. The combination of the automatic spring-actuated stop in the guard-holder with the primary cone of the spring-winding mandrel normally stationary on the rotating driving-shaft, and with the wire-gripper in the head of said cone, and the driver on the rotating face-plate normally inactive in the absence of the wire, but automatically engaged by the wire-gripper when the wire is presented, and thus rotating the mandrel for coiling the spring, the action of said stop being overcome by the driving-grippers, substantially as described.

5. The combination of the double-cone spring-coiling rotating mandrel, reciprocating cross-head having the primary cone mounted on it, the pneumatic ram for actuating the cross-head, the wire-cutting abutment, and the lever having the cutter and connecting with and automatically actuating the lever coupled with and opening the valve-rod of the ram to withdraw the primary cone for the discharge of the coiled spring through the cutting off of the coiled spring, substantially as described.

6. The combination of the double-cone spring-winding mandrel, one of which cones is revoluble in fixed supports and the other on a reciprocating cross-head for separating the cones to discharge the springs, the pneumatic ram for actuating the cross-head and the attachments, respectively, on the cross-head, and the valve-rod for automatically shifting the valves for reversing the ram by the movement of the cross-head, substantially as described.

7. The combination of the double-cone spring-coiling rotating mandrel, reciprocating cross-head having the primary cone on it, the guard surrounding the other cone and mounted in the stationary supports, the ejector for the spring in said guard, and the rod and the arm on the cross-head automatically actuating said ejector, substantially as described.

8. The combination, with the double-cone spring-coiling mandrel, of the cradle located alongside of and below the mandrel for receiving the discharged springs from said mandrel and holding them for being compressed, the stationary and movable compressing-plates located at the ends of said cradle, respectively, and the ram actuating the movable plate so as to compress the springs between the two plates, substantially as described.

9. The combination, with the double-cone spring-coiling mandrel, of the cradle receiving the discharged springs from said mandrel and holding them for being compressed, the compressing-plates, centering wing-cones in said plates, and the ram actuating one of said plates, substantially as described.

10. The combination, with the spring-coiling cone-mandrel and ejector for the coiled springs, of the cradle receiving the springs from the cone-mandrel and holding them to be compressed, the compressing-plates, the retiring centering wing-cones, and the ram for actuating one of said compressing-plates, substantially as described.

11. The combination, with the spring-coiling cone-mandrel and reciprocating cross-head carrying the primary cone, of the ejector for the coiled springs, the cradle receiving the springs from the cone-mandrel and holding them to be compressed, the compressing-plates, the ram for actuating one of said plates, the lever actuating the valve-rod of said ram, and the latch on the cross-head for actuating said lever, substantially as described.

12. The combination of the spring-receiving cradle, the compressing-plates in and at the extremities thereof, the pneumatic ram carrying one of said plates on its cross-head, the valve-rod of said ram extending along the cradle, the crank on said rod, and the inclined arm of the cradle side subject to the action of the cross-head for reversing the ram-valves and automatically reversing the ram, substantially as described.

13. The combination of the cradle for receiving and holding the springs, the stationary compressing-plate, the sliding centering wing-cone in it, the reciprocating compressing-plate, and the sliding centering-cone in it, substantially as described.

14. The combination of the double-cone spring-coiling mandrel and the ejector for the coiled springs, the spring receiving and holding and discharging cradle, the compressing-plates, and the ram actuating the movable compressing-plate, said cradle being opened by the ram and closed by any suitable means, substantially as described.

15. The combination of the horizontally-arranged spring receiving and holding cradle, two compressing-plates, one of which is stationary and the other reciprocating in said cradle, and the centering and reciprocating wing-cones in said compressing-plates, said cradle having the automatically opening and closing side, substantially as described.

16. The combination, with the finishing-cone and the guard surrounding it, of the spring-ejecting ring in the annular space between the guard and the cone, the shifting rod and stops connected with said ring, and the arm on the cross-head having said rod extending through it, substantially as described.

17. The combination, in a furniture-spring-coiling machine, of the double-cone mandrel made in separately mounted and geared parts, the reciprocating cross-head carrying the primary cone and its shaft, the guard surrounding the primary cone, and the guard surrounding the finishing-cone, substantially as described.

Signed at Jersey City, in the county of Hudson and State of New Jersey, this 11th day of February, A. D. 1889.

CHRISTOPHER R. JAMES.

Witnesses:
WM. A. LANE,
THOMAS ROSE.